W. H. EYNON.
ARMORED HOSE.
APPLICATION FILED JAN. 27, 1910. RENEWED DEC. 11, 1912.

1,068,491.

Patented July 29, 1913.

Witnesses:
F. C. Valentine
A. C. Otter

Inventor:
William H. Eynon,
by Obed W. Billman
Attorney.

UNITED STATES PATENT OFFICE.

WILLIAM H. EYNON, OF CLEVELAND, OHIO.

ARMORED HOSE.

1,068,491.  Specification of Letters Patent.  Patented July 29, 1913.

Application filed January 27, 1910, Serial No. 540,382. Renewed December 11, 1912. Serial No. 736,234.

*To all whom it may concern:*

Be it known that I, WILLIAM H. EYNON, a citizen of the United States, residing at Cleveland, in the county of Cuyahoga and State of Ohio, have invented certain new and useful Improvements in Armored Hose, of which the following is a specification.

My invention relates to improvements in armored-hose, and more particularly, to reinforced high pressure hose for use as air-hose used in connection with pneumatically operated tools, or the air-brake systems of railroad trains, as well as for use as high pressure water-hose employed by fire-departments and the water-work systems of municipalities.

The primary object of the invention is to provide a generally improved armored-hose, for the purposes above mentioned, adapted to carry fluid under very high pressure, and at the same time, provide an armored-hose of great flexibility and elasticity which will be to a minimum extent affected by the deteriorating action of the elements while in use.

The chain-mesh or mail-armor used as a reinforcing and strengthening element is of very fine mesh and is not in any way to be confounded or confused with such metallic armor fabric as woven wire or connected strips or plates of metal heretofore used as an armor or reinforcing element in hose of this character. The specific construction of the chain-mesh embedded and vulcanized in the walls of the hose is such as to adapt it to provide great flexibility in any direction, and the links of the chain-mesh may be made of copper since copper stretches considerably before breaking.

With the above mentioned ends in view, the invention consists in the novel construction, arrangement, and combination of parts, hereinafter described, illustrated in one of its embodiments in the accompanying drawings, and particularly pointed out in the appended claims.

Figure 1:
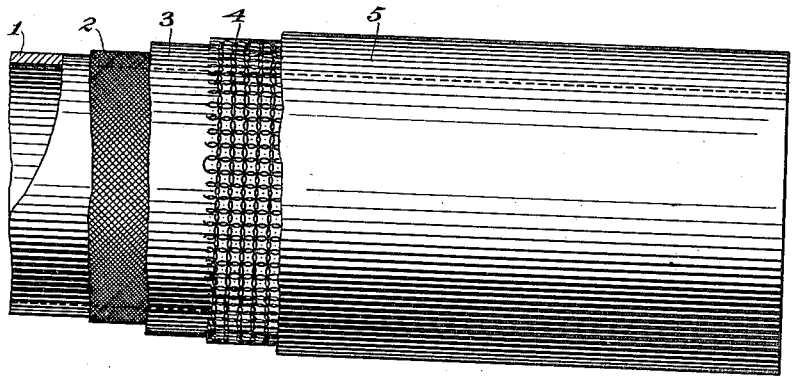
Figure 2:
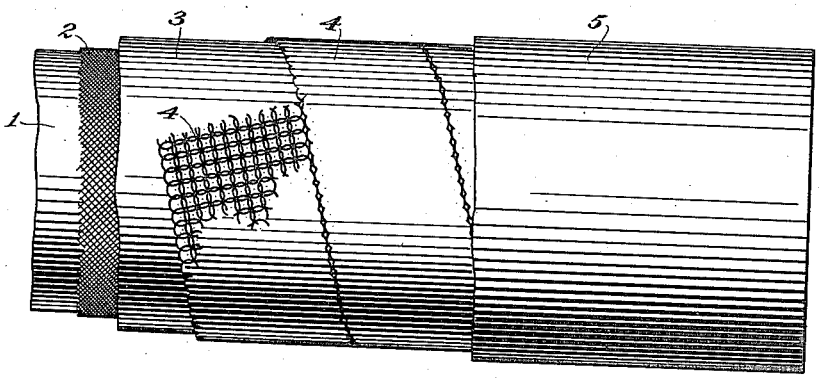
Figure 4:
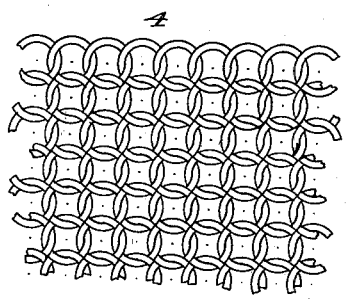
Figure 3:
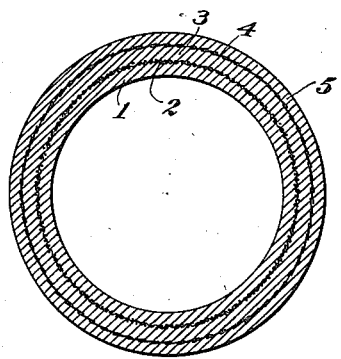

Referring to the drawings, forming a part of this specification, Figure 1, illustrates a section of armored-hose having the successive layers or jackets removed at the ends so as to expose the next adjacent layer. Fig. 2, a similar view illustrating a modified form and method of applying the chain-mesh armor fabric. Fig. 3, a cross-sectional view of the improved armored-hose. Fig. 4, a greatly enlarged view of a section of the improved chain-mesh armor fabric.

Similar numerals of reference designate like parts throughout all the figures of the drawings.

The improved armored-hose comprises the usual tubular body consisting of an inner tube of rubber 1, or other suitable compound adapted to resist the action of deleterious substances, said interior tube being preferably surrounded by a reinforcing element such as a superposed tube or layer of cotton duck 2, or similar fibrous material. The reinforcing element or layer of duck is preferably surrounded by a superposed layer of rubber 3, and as a means for reinforcing the tubular body as a whole and at the same time protecting the reinforcing cotton fibrous material, a layer or ply of chain-mesh 4, is embedded and vulcanized in the tubular rubber body adjacent to the layer of rubber 3, and surrounding the tubular reinforcing duck 2.

The layer or ply of chain-mesh 4, may be incorporated and vulcanized in the tubular rubber body in any suitable and convenient manner and may be woven in the form of a seamless tubular body as indicated in Fig. 1, or in the form of a strip of material spirally or helically wound as indicated in Fig. 2, of the drawings.

The tubular layer of chain-mesh armor is preferably surrounded by a covering 5, of substantial thickness, of a compound of rubber adapted to withstand rough usage and exposure to the elements.

From the foregoing description, taken in connection with the accompanying drawings, the construction and advantages of my invention will be readily understood.

Having thus described my invention, what I claim and desire to secure by Letters Patent is,—

1. An armored hose, comprising a tubular rubber body, and tubular chain-mesh incorporated and vulcanized therein and substantially spaced from the inner and outer surfaces thereof.

2. An armored hose, comprising an interior tube of rubber, a superposed layer of duck, a layer of rubber superposed on said layer of duck, a layer of chain-mesh vulcanized in said layer of rubber and inclosing said layer of duck, and a covering of rubber.

3. An armored hose, comprising a tubular rubber body provided with a tubular layer of chain-mesh made up of a strip of helically wound chain-mesh having its meshes incorporated and vulcanized therein and substantially spaced from the inner and outer surfaces of the walls thereof.

4. An armored hose, comprising a tubular rubber body, a tubular layer of cotton duck embedded and vulcanized therein, and a strip of chain-mesh helically wound and vulcanized in said rubber body forming a tubular chain-mesh armor surrounding said tubular layer of cotton duck and substantially spaced from the outer surface of said tubular rubber body.

In testimony whereof I have affixed my signature, in presence of two witnesses.

WILLIAM H. EYNON.

Witnesses:
O. C. BILLMAN,
GEO. H. BILLMAN.